(12) United States Patent
Takai

(10) Patent No.: US 11,899,415 B2
(45) Date of Patent: Feb. 13, 2024

(54) INFORMATION PROCESSING SYSTEM WITH CIRCUITRY TO SEQUENTIALLY PROCESS RECEIVED DATA

(71) Applicant: Mitsubishi Electric Corporation, Tokyo (JP)

(72) Inventor: Manato Takai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 252 days.

(21) Appl. No.: 17/432,553

(22) PCT Filed: Apr. 24, 2019

(86) PCT No.: PCT/JP2019/017504
§ 371 (c)(1),
(2) Date: Aug. 20, 2021

(87) PCT Pub. No.: WO2020/217357
PCT Pub. Date: Oct. 29, 2020

(65) Prior Publication Data
US 2022/0146994 A1 May 12, 2022

(51) Int. Cl.
*G05B 13/04* (2006.01)
(52) U.S. Cl.
CPC ......... *G05B 13/041* (2013.01); *G05B 13/047* (2013.01)
(58) Field of Classification Search
CPC ................ G05B 13/041; G05B 13/047
USPC ............................................. 700/29
See application file for complete search history.

(56) References Cited

U.S. PATENT DOCUMENTS

| | | | |
|---|---|---|---|
| 2012/0270162 A1* | 10/2012 | Dahlhielm | F23N 5/082 431/12 |
| 2013/0120917 A1* | 5/2013 | Minezawa | G06F 1/3265 361/679.01 |
| 2017/0351279 A1* | 12/2017 | Ishii | G06F 3/0679 |

(Continued)

FOREIGN PATENT DOCUMENTS

| | | |
|---|---|---|
| JP | 2003-210420 A | 7/2003 |
| JP | 6012687 B2 | 10/2016 |
| WO | 2016/208354 A1 | 12/2016 |

OTHER PUBLICATIONS

NPL: Age of Information: Design and Analysis of Optimal Scheduling Algorithms, 2017 IEEE International Symposium on Information Theory (ISIT)), By: Hsu (Year: 2017).*

(Continued)

*Primary Examiner* — Jigneshkumar C Patel
(74) *Attorney, Agent, or Firm* — XSENSUS LLP

(57) ABSTRACT

There is provided an information processing system capable of suppressing arising of unprocessed data and depreciation of data with the lapse of time. The information processing system (1) includes a buffer unit (5), a processing unit (6), and a control unit (9). The buffer unit (5) sequentially receives data acquired by an observation terminal (2) from the observation terminal (2). The processing unit (6) sequentially processes the data received by the buffer unit (5). The control unit (9) controls an index value indicating information freshness by adjusting a resource of processing of the processing unit (6). The index value indicating the information freshness is calculated based on elapsed time from the time when the data is acquired by the observation terminal (2).

8 Claims, 6 Drawing Sheets

(56) References Cited

U.S. PATENT DOCUMENTS

2018/0191812 A1    7/2018    Togashi

OTHER PUBLICATIONS

International Search Report and Written Opinion dated Jun. 25, 2019, received for PCT Application PCT/JP2019/017504, Filed on Apr. 24, 2019, 8 pages including English Translation.

* cited by examiner

INFORMATION PROCESSING SYSTEM WITH CIRCUITRY TO SEQUENTIALLY PROCESS RECEIVED DATA

CROSS-REFERENCE TO RELATED APPLICATION

The present application is based on PCT filing PCT/JP2019/017504, filed Apr. 24, 2019, the entire contents of which are incorporated herein by reference.

FIELD

The present invention relates to an information processing system.

BACKGROUND

Patent Literature 1 discloses an example of an information processing system. The information processing system collects data from a terminal. The information processing system selects data to be transmitted to a data processing device from the collected data based on a load state of the data processing device.

CITATION LIST

Patent Literature

[PTL 1] WO 2016/208354 A1

SUMMARY

Technical Problem

However, in the information processing system of PTL 1, unselected data is not transmitted to the data processing device. Therefore, there is a possibility that data not to be processed by the data processing device arises. In the case where a state of an object represented by the data changes with time, the data and the current state of the object may deviate as time elapses from the time of data acquisition. That is, the data may depreciate with the lapse of time.

The present invention is implemented to solve such a problem. An object of the present invention is to provide an information processing system capable of suppressing arising of unprocessed data and depreciation of data with the lapse of time.

Solution to Problem

An information processing system according to the present invention is provided with: a buffer unit configured to sequentially receive data acquired by an observation terminal from the observation terminal; a processing unit configured to sequentially process the data received by the buffer unit; and a control unit configured to control an index value indicating information freshness by adjusting a resource of processing of the processing unit, the index value being calculated based on elapsed time from a time when the data is acquired by the observation terminal.

Advantageous Effects of Invention

According to the present invention, an information processing system includes a buffer unit, a processing unit, and a control unit. The buffer unit sequentially receives data acquired by an observation terminal from the observation terminal. The processing unit sequentially processes the data received by the buffer unit. The control unit controls an index value indicating information freshness by adjusting a resource of processing of the processing unit. The index value indicating the information freshness is calculated based on elapsed time from the time when the data is acquired by the observation terminal. Accordingly, arising of unprocessed data and depreciation of data with the lapse of time can be suppressed.

DESCRIPTION OF EMBODIMENTS

Embodiments of the present invention will be described with reference to the attached drawings. In the individual drawings, same signs are attached to same or corresponding parts, and redundant description is appropriately simplified or omitted.

Embodiment 1

Figure 1:
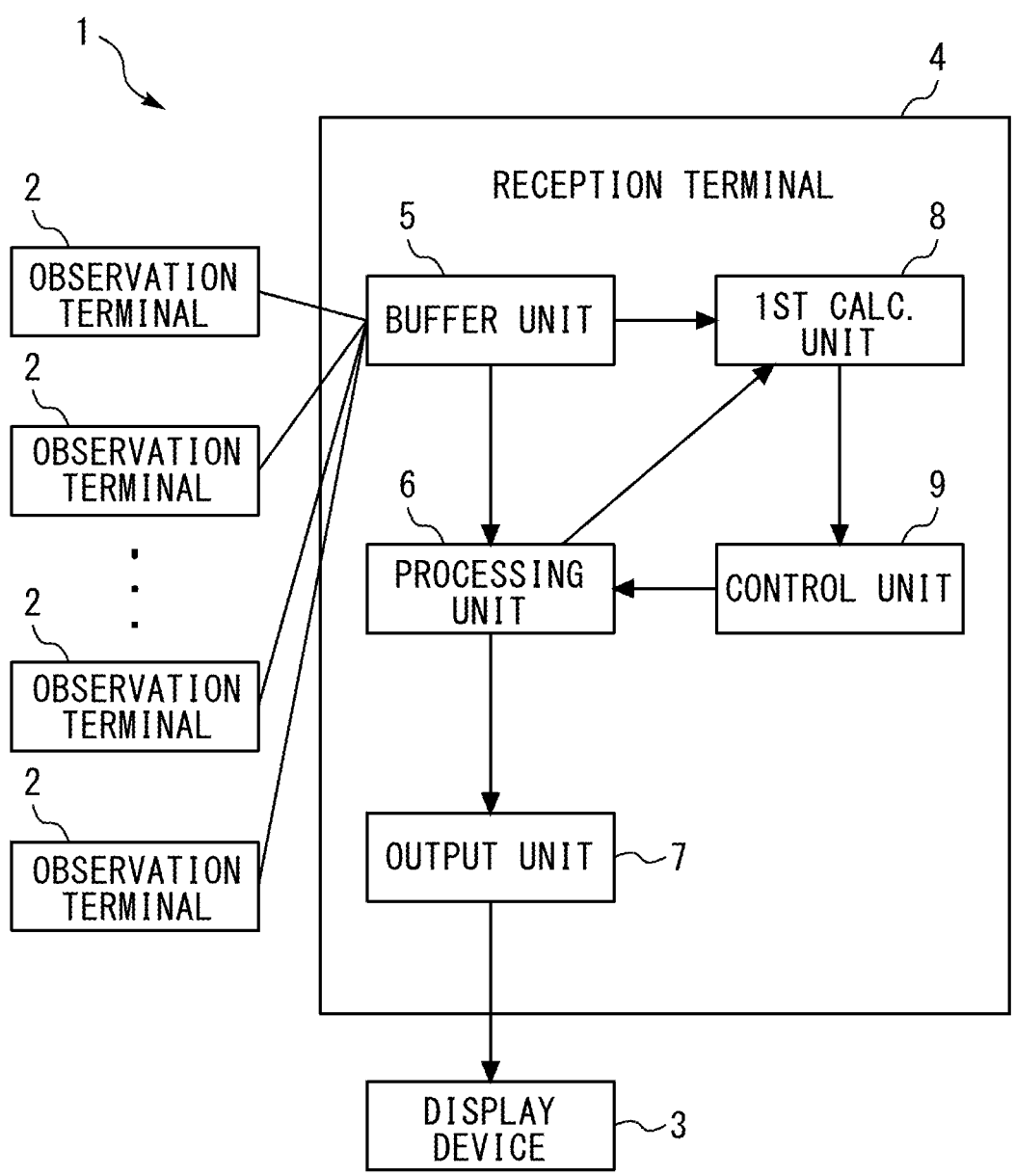
FIG. 1 is a configuration diagram of an information processing system according to Embodiment 1.

FIG. 1 is a configuration diagram of an information processing system according to Embodiment 1.

An information processing system 1 is applied to a remote monitoring system of an elevator for example. The information processing system 1 includes one or more observation terminals 2, a display device 3 and a reception terminal 4. In this example, the observation terminal 2 is a remote monitoring device provided in an elevator unit. At the time, the reception terminal 4 is a server device provided in an information center for example. The elevator unit is a device including a car which moves inside a hoistway long in a vertical direction for example. The remote monitoring device is a device which monitors a state of the elevator unit. The information center is a site where information about the elevator is collected.

The observation terminal 2 is a device which acquires data. In this example, the observation terminal 2 is a device which acquires the data indicating the state of the elevator unit where the observation terminal 2 is provided. The data acquired by the observation terminal 2 includes the information of a time when the data is acquired. The observation terminal 2 is connected to the reception terminal 4 so as to output the acquired data.

The data is repeatedly acquired by the observation terminal 2. An interval of data acquisition by the observation terminal 2 is distributed according to an exponential distribution, a degenerate distribution, an Erlang distribution or other general distributions for example. Here, the data acquisition interval is a period of time from the time when one of the one or more observation terminals 2 acquires the data to the time when one of the one or more observation terminals 2 acquires the data next. At the time, a data acquisition rate $\lambda$ is a reciprocal of an average value of the data acquisition interval. The data acquisition rate $\lambda$ may be a variable value calculated based on the number of times of the data acquisition per unit time between the current time and the time going back for a preset period of time from the current time for example.

The display device 3 is a device which displays a situation of the object for which the observation terminal 2 acquires the data. In this example, the display device 3 is a device which displays the situation of the elevator. The display device 3 is a display unit for example.

The reception terminal 4 includes a buffer unit 5, a processing unit 6, an output unit 7, a first calculation unit 8, and a control unit 9.

The buffer unit 5 is a part which sequentially receives the data sequentially outputted by the observation terminal 2. The buffer unit 5 includes a queue structure of FIFO (First-In First-Out) for example which temporarily stores the data.

The processing unit 6 is a part which sequentially processes the data received by the buffer unit 5. Processing by the processing unit 6 is, for example, processing for displaying content of the data, processing for recording the data or processing for extracting information from the data. In this example, the processing unit 6 does not discard the data to be processed by selection.

A resource of the processing of the processing unit 6 is variable. Here, the resource of the processing is a computation resource for example. For the resource of the processing of the processing unit 6, an upper limit may be set. The processing unit 6 may include a processing device a clock frequency of which is variable for example. At the time, the resource of the processing of the processing unit 6 is controlled by the clock frequency for example. At the time, the upper limit of the resource of the processing of the processing unit 6 is set by the clock frequency for example. Alternatively, the processing unit 6 may include a plurality of processing devices with different processing performances for example. At the time, the resource of the processing of the processing unit 6 is controlled by selection of the processing device to perform a computation for example. At the time, the upper limit of the resource of the processing of the processing unit 6 is set by the resource of the processing of the selected processing device for example. Alternatively, the processing unit 6 may include a processing device in which the number of cores to perform the computation is variable for example. In addition, the processing unit 6 may be clustered by a plurality of computers. At the time, the resource of the processing of the processing unit 6 is controlled by the number of the cores to perform the computation for example. At the time, the upper limit of the resource of the processing of the processing unit 6 is set by the number of the cores for example.

A service interval of the processing by the processing unit 6 is distributed according to the exponential distribution, the degenerate distribution, the Erlang distribution or other general distributions for example. Here, the processing service interval is a period of time from the time when the processing unit 6 completes data processing to the time when the processing unit 6 completes the data processing next. At the time, a processing service rate $\mu$ is a reciprocal of the average value of the processing service interval. The processing service rate $\mu$ may be a variable value calculated based on the number of pieces of the processing completed per unit time between the current time and the time going back for the preset period of time from the current time for example.

The output unit 7 is a part which outputs a result of the processing by the processing unit 6. The output unit 7 outputs the information for displaying the content of the data to the display device 3 for example.

The first calculation unit 8 is a part which calculates the data acquisition rate $\lambda$ by the observation terminal 2. Further, the first calculation unit 8 is also a part which calculates the processing service rate $\mu$ by the processing unit 6. The first calculation unit 8 calculates the acquisition rate $\lambda$ based on the data acquisition time included in the data received by the buffer unit 5 for example. The first calculation unit 8 calculates the service rate $\mu$ by monitoring the time when the processing unit 6 acquires the processing for example.

The control unit 9 is a part which controls an index value indicating information freshness by adjusting the resource of the processing of the processing unit 6. The index value indicating the information freshness is calculated based on elapsed time from the time when the data is acquired by the observation terminal 2. The index value indicating the information freshness is a value indicated by AoI (Age of Information) for example.

Figure 2:
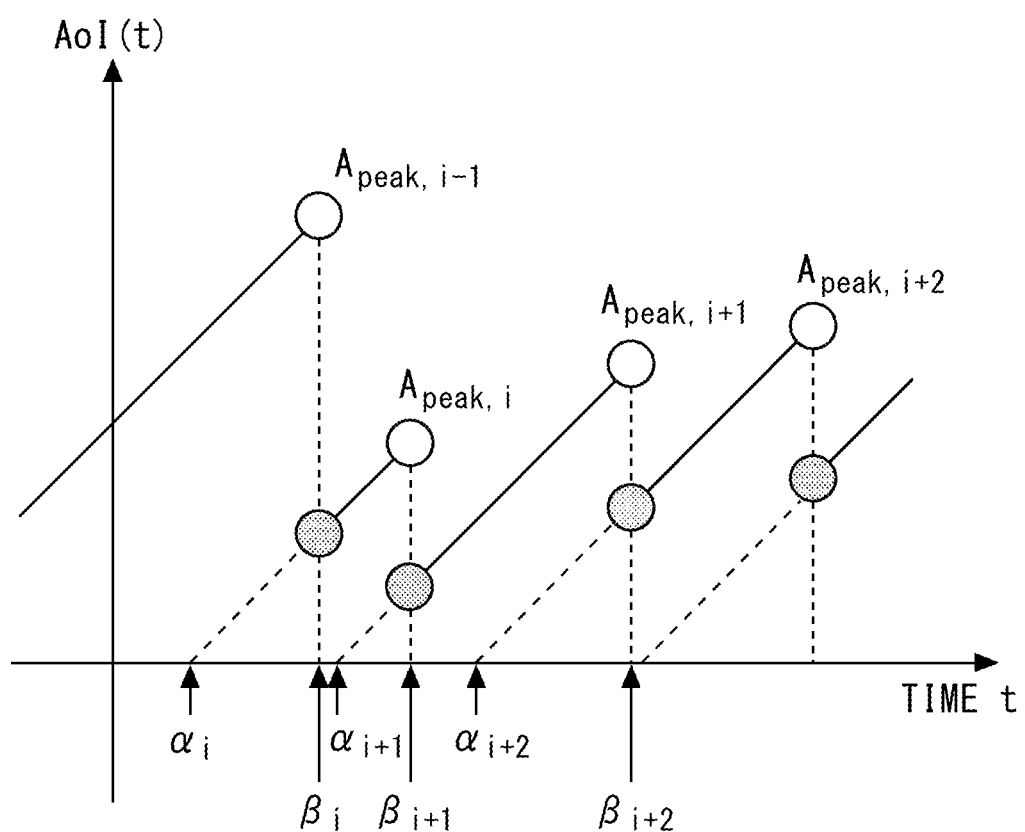
FIG. 2 is a diagram illustrating an example of temporal change of AoI.

FIG. 2 is a diagram illustrating an example of temporal change of the AoI.

In FIG. 2, a horizontal axis indicates time t. In FIG. 2, a vertical axis indicates the AoI at the time t.

In this example, $\alpha_i$ is the time when i-th data is acquired. $\beta_i$ is the time when the processing of the i-th data is completed. In this example, $\beta_i$ is the time when the display device 3 receives the information for displaying the content of the i-th data from the output unit 7. Here, it is assumed that the period of time from completion of data processing to information reception by the display device 3 is sufficiently short relative to the period of time of the data processing. In FIG. 2, $A_{peak,i}$ indicates i-th peak AoI. The i-th peak AoI is the AoI immediately before the time $\beta_i$ when the i-th data is updated.

The AoI indicates the elapsed time from the time when the latest data is acquired by the observation terminal 2. The latest data is the data the content of which is displayed at the display device 3 for example. In this example, the content displayed at the display device 3 is discontinuously updated by the completion of the processing by the processing unit 6. Therefore, as illustrated in FIG. 2, the AoI at the time t is indicated by a plurality of discontinuous line segments.

In this way, the AoI indicates the information freshness which depreciates with the lapse of time. The control unit 9 uses a time average E[A] of the AoI in a steady state as the index value indicating the information freshness for example. The time average of the AoI in the steady state is obtained, when modeling the reception terminal 4 by a queueing model, by a utilization rate $\rho$ of the queueing model. Here, the utilization rate $\rho$ is a value for which the acquisition rate $\lambda$ is divided by the service rate $\mu$.

Figure 3:
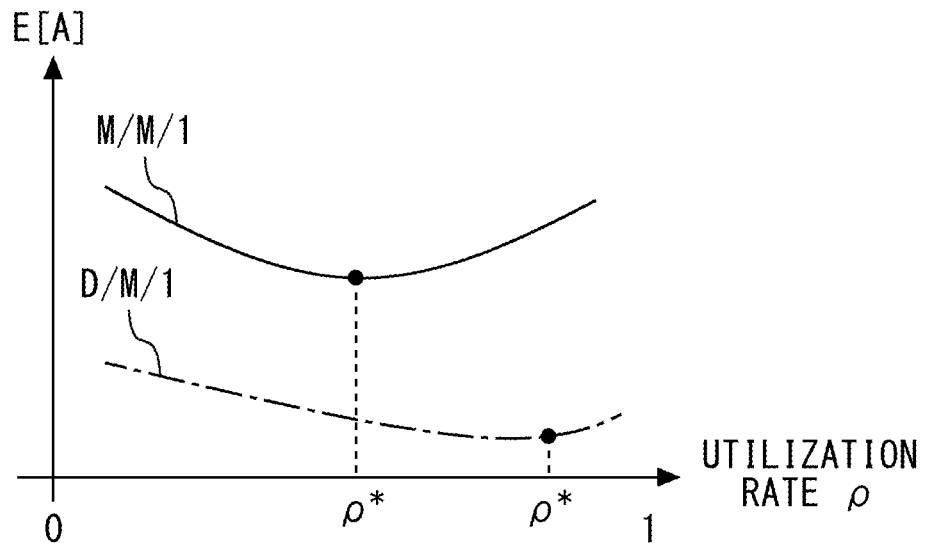
FIG. 3 is a diagram illustrating an example of a relation between the utilization rate and the time average of the AoI in the steady state.

FIG. 3 is a diagram illustrating an example of a relation between the utilization rate and the time average of the AoI in the steady state.

In FIG. 3, the horizontal axis indicates the utilization rate ρ. In FIG. 3, the vertical axis indicates the time average E[A] of the AoI in the steady state.

FIG. 3 illustrates the AoI when modeling the reception terminal 4 by an M/M/1 queueing model and the AoI when modeling the reception terminal 4 by a D/M/1 queueing model. Here, the queueing model is indicated by Kendall notation. The M/M/1 queueing model is the queueing model for which the data acquisition interval follows the exponential distribution, the processing service interval follows the exponential distribution, and the number of the processing unit 6 is one. The D/M/1 queueing model is the queueing model for which the data acquisition interval follows the degenerate distribution, the processing service interval follows the exponential distribution, and the number of the processing unit 6 is one. The reception terminal 4 may be modeled by a queueing model not illustrated here.

For the M/M/1 queueing model, the time average E[A] of the AoI in the steady state is indicated by the following equation (1).

[Math. 1]

$$E[A] = \frac{1}{\mu}\left(1 + \frac{1}{\rho} + \frac{\rho^2}{1-\rho}\right). \tag{1}$$

For the D/M/1 queueing model, the time average E[A] of the AoI in the steady state is indicated by the following equation (2). Here, W is the Lambert W function.

[Math. 2]

$$E[A] = \frac{1}{\mu}\left(\frac{1}{2\rho} + \frac{1}{1-\gamma}\right), \gamma = -\rho W\left(-\frac{1}{\rho}e^{-\frac{1}{\rho}}\right). \tag{2}$$

As illustrated in FIG. 3, the time average E[A] of the AoI in the steady state in the case where the service rate μ is given has a minimum value to the change of the utilization rate ρ. In addition, the utilization rate that minimizes the E[A] is determined by the queueing model. In this way, when the minimum value of the E[A] is a target value of the index value indicating the information freshness, a utilization rate ρ* corresponding to the target value is determined by the queueing model.

In addition, in the case where a possible range of the service rate μ is set, such as the case where the upper limit is set for the resource of the processing of the processing unit 6, the possible range of the value of the utilization rate ρ is determined according to the acquisition rate λ. In the steady state in this case, the time average E[A] of the AoI has the minimum value to the change of the utilization rate ρ in the possible value range. In addition, the utilization rate that minimizes the E[A] in the range of the utilization rate ρ determined according to the acquisition rate λ is determined by the queueing model. In this way, when the minimum value of the E[A] according to the acquisition rate λ is the target value of the index value indicating the information freshness, the utilization rate ρ* corresponding to the target value is determined by the queueing model.

The control unit 9 adjusts the service rate μ by adjusting the resource of the processing of the processing unit 6 so that the utilization rate ρ obtained from the acquisition rate λ and the service rate μ calculated by the first calculation unit 8 becomes the utilization rate ρ* corresponding to the target value of the index value indicating the information freshness.

Figure 4:
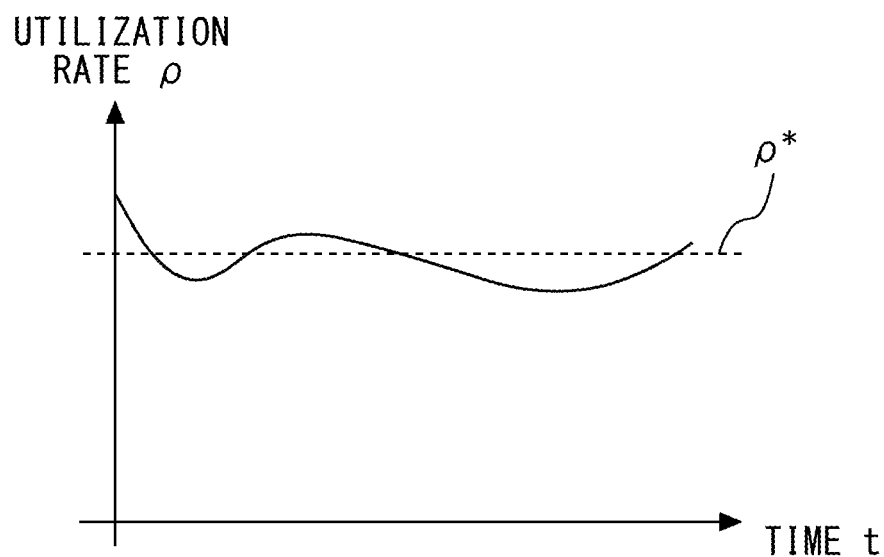
FIG. 4 is a diagram illustrating an example of control of the utilization rate by the control unit according to Embodiment 1.

FIG. 4 is a diagram illustrating an example of control of the utilization rate by the control unit according to Embodiment 1.

In FIG. 4, the horizontal axis indicates the time t. In FIG. 4, the vertical axis indicates the utilization rate ρ obtained from the acquisition rate λ and the service rate μ calculated by the first calculation unit 8. In FIG. 4, the utilization rate ρ* corresponding to the target value of the index value indicating the information freshness is indicated with a broken line.

The control unit 9 outputs a control signal which adjusts the resource to the processing unit 6. The control unit 9 controls an adjustment amount of the resource by PID (Proportional-Integral-Differential) control for example. Alternatively, the control unit 9 may control the adjustment amount of the resource by reinforcement learning for example. At the time, a reward of the reinforcement learning is calculated based on the value of the service rate μ for example. Alternatively, the reward of the reinforcement learning may be calculated based on a deviation between the target value ρ* of the utilization rate determined according to the acquisition rate λ and the utilization rate ρ calculated by the first calculation unit 8.

As described above, the information processing system 1 according to Embodiment 1 includes the buffer unit 5, the processing unit 6 and the control unit 9. The buffer unit 5 sequentially receives the data acquired by the observation terminal 2 from the observation terminal 2. The processing unit 6 sequentially processes the data received by the buffer unit 5. The control unit 9 controls the index value indicating the information freshness by adjusting the resource of processing of the processing unit 6. The index value indicating the information freshness is calculated based on the elapsed time from the time when the data is acquired by the observation terminal 2.

The control unit 9 controls the index value indicating the information freshness by adjusting the resource of the processing of the processing unit 6. The data received by the buffer unit 5 is sequentially processed by the processing unit 6. Therefore, arising of unprocessed data is suppressed. In addition, depreciation of the data with the lapse of time is suppressed. Therefore, the information processing system 1 is applicable even to a system in which it is preferable not to discard the data to be acquired, such as the remote monitoring system of an elevator.

Further, the information processing system 1 includes the first calculation unit 8. The first calculation unit 8 calculates the data acquisition rate λ by the observation terminal 2. The first calculation unit 8 calculates the processing service rate μ by the processing unit 6. The relation between the utilization rate ρ for which the acquisition rate λ is divided by the service rate μ and the index value is predetermined by the queueing model. At the time, the control unit 9 controls the service rate μ by adjusting the resource of the processing of the processing unit 6 so that the utilization rate ρ obtained from the acquisition rate λ and the service rate μ calculated by the first calculation unit 8 becomes the utilization rate ρ* corresponding to the target value of the index value. The target value of the index value is the value predetermined based on the acquisition rate λ and the queueing model.

By the queueing model, the relation between the target value of the index value and the utilization rate ρ is determined. Therefore, the target value ρ* of the utilization rate for turning the index value to the target value according to the acquisition rate λ is determined. The acquisition rate λ, the service rate μ and the utilization rate ρ are the values that can be successively calculated based on the situation of the data acquisition and processing. Accordingly, the control unit 9 can calculate a control amount of the service rate μ so as to turn the index value to the target value, based on the utilization rate ρ. In addition, the first calculation unit 8 does not require individual parameter setting for each piece of data in calculation of the acquisition rate λ, the service rate μ and the utilization rate ρ. Therefore, the information processing system 1 is generally applicable for a system that can be modeled by the queueing model.

Note that the target value of the index value based on the acquisition rate λ and the queueing model may be determined by a penalty function for example. The penalty function is a function which takes a large value as the service rate μ becomes large, for example. The penalty function may be a monotone increasing function by a linear function, a power function, a step function, an exponential function and a combination of the functions or the like for example. At the time, the target value of the index value may be set so as to minimize a sum of the time average E[A] of the AoI and the penalty function for example. That is, the utilization rate ρ* corresponding to the target value at the time is the utilization rate calculated from the acquisition rate λ and the service rate μ that minimize the sum of the time average E[A] of the AoI and the penalty function.

In addition, the observation terminal 2 may be an individual sensor provided in the elevator unit. At the time, the reception terminal 4 is the remote monitoring device provided in the unit for example. In this case, the processing unit 6 of the reception terminal 4 performs the processing of converting the collected data of the sensor to a form utilizable for remote monitoring of the unit for example. The output unit 7 of the reception terminal 4 transmits a result of the processing by the processing unit 6 to the server device of the information center for example.

Further, the information processing system 1 may be applied to a system in which data of an escalator or other building facilities or the like is repeatedly acquired for example.

Next, an example of a hardware configuration of the information processing system 1 will be described using FIG. 5.

Figure 5:
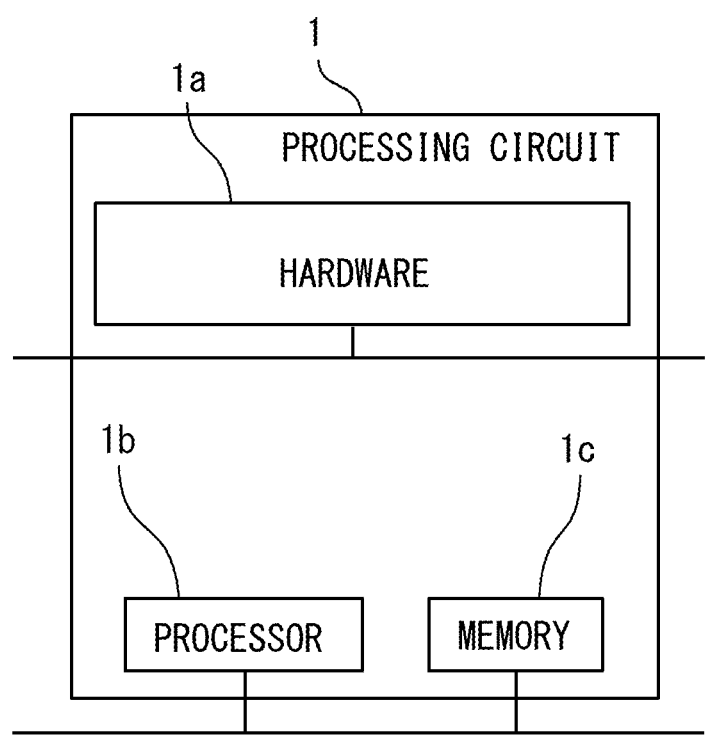
FIG. 5 is a diagram illustrating the hardware configuration of a main part of the information processing system according to Embodiment 1.

FIG. 5 is a diagram illustrating the hardware configuration of a main part of the information processing system according to Embodiment 1.

Individual functions of the information processing system 1 can be achieved by a processing circuit. The processing circuit includes at least one processor 1b and at least one memory 1c. The processing circuit may include at least one piece of dedicated hardware 1a together with the processor 1b and the memory 1c or as a substitute for them.

In the case where the processing circuit includes the processor 1b and the memory 1c, the individual functions of the information processing system 1 are achieved by software, firmware or the combination of the software and the firmware. At least one of the software and the firmware is described as a program. The program is stored in the memory 1c. The processor 1b achieves the individual functions of the information processing system 1 by reading and executing the program stored in the memory 1c.

The processor 1b is also referred to as a CPU (Central Processing Unit), a processing device, an arithmetic unit, a microprocessor, a microcomputer or a DSP. The memory 1c is configured by a nonvolatile or volatile semiconductor memory such as a RAM, a ROM, a flash memory, an EPROM or an EEPROM, a magnetic disk, a flexible disk, an optical disk, a compact disk, a mini disk or a DVD, for example.

In the case where the processing circuit includes the dedicated hardware 1a, the processing circuit is achieved by a single circuit, a composite circuit, a programmed processor, a parallel programmed processor, an ASIC, an FPGA or the combination thereof, for example.

Each of the individual functions of the information processing system 1 can be achieved in the processing circuit. Alternatively, the individual functions of the information processing system 1 can also be achieved altogether in the processing circuit. For the individual functions of the information processing system 1, a part may be achieved by the dedicated hardware 1a and the other part may be achieved by the software or the firmware. In this way, the processing circuit achieves the individual functions of the information processing system 1 by the hardware 1a, the software, the firmware or the combination thereof.

Embodiment 2

In Embodiment 2, points different from the example disclosed in Embodiment 1 will be described in detail. For features not described in Embodiment 2, any features of the example disclosed in Embodiment 1 may be adopted.

Figure 6:
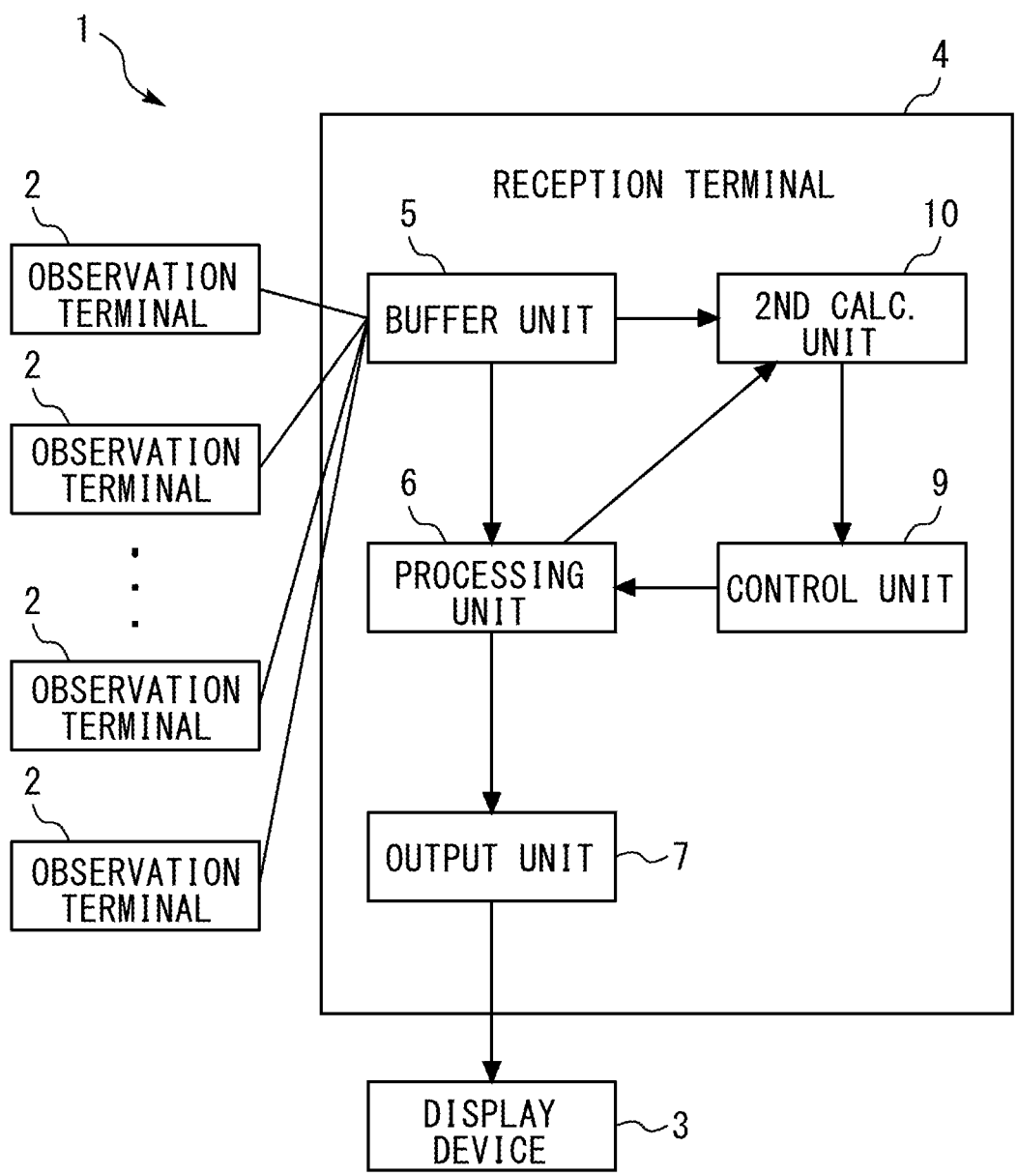
FIG. 6 is a configuration diagram of the information processing system according to Embodiment 2.

FIG. 6 is a configuration diagram of the information processing system according to Embodiment 2.

The reception terminal 4 according to Embodiment 2 includes a second calculation unit 10.

The second calculation unit 10 is a part which calculates the index value indicating the information freshness based on the elapsed time from the time when the data is acquired by the observation terminal 2.

The second calculation unit 10 uses a moving average MA[A] of the AoI for example as the index value indicating the information freshness. A moving average is the time average between the current time and the time going back for the preset period of time from the current time. Alternatively, the second calculation unit 10 may use the average value of the peak AoI between the current time and the time going back for the preset period of time from the current time as the index value indicating the information freshness. Here, the AoI indicates that the information freshness is higher when the value is smaller. That is, the moving average MA[A] of the AoI and the average value of the peak AoI are the examples of the index value indicating that the information freshness is higher when the value is smaller.

Figure 7:
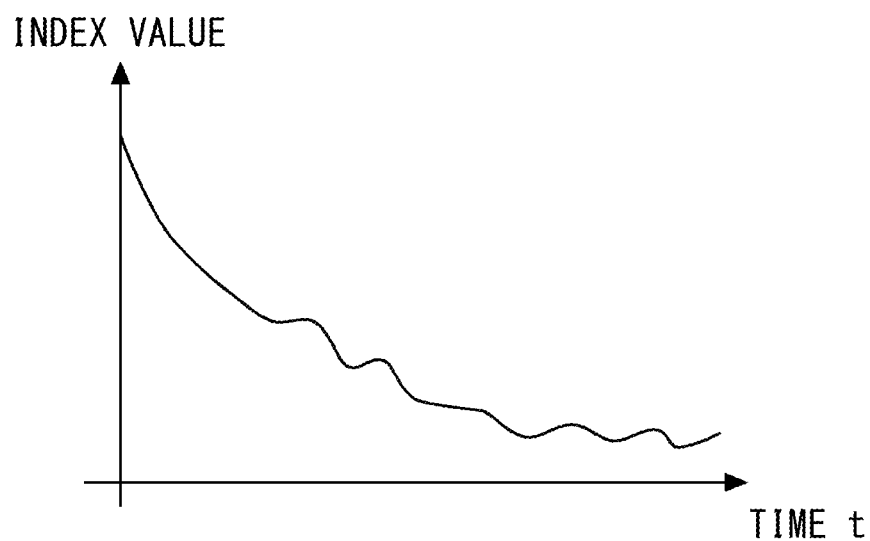
FIG. 7 is a diagram illustrating an example of control of the index value indicating the information freshness by the control unit according to Embodiment 2.

FIG. 7 is a diagram illustrating an example of control of the index value indicating the information freshness by the control unit according to Embodiment 2.

In FIG. 7, the horizontal axis indicates the time t. In FIG. 7, the vertical axis indicates the index value of the information freshness. In this example, the index value indicates that the information freshness is higher when the value is smaller.

The control unit 9 adjusts the resource of the processing of the processing unit 6 so as to make the index value calculated by the second calculation unit 10 small. The control unit 9 outputs the control signal which adjusts the resource to the processing unit 6. The control unit 9 controls the adjustment amount of the resource by the reinforcement learning for example. At the time, the reward of the reinforcement learning is calculated based on the index value for example. In the case, for example, where the index value is the moving average MA[A] of the AoI, the reward of the reinforcement learning is the value calculated, for example, so as to be higher when the moving average MA[A] is smaller. Alternatively, the control unit 9 may adjust the resource of the processing unit 6 by the PID control or the like.

As described above, the information processing system 1 according to Embodiment 2 includes the second calculation unit 10. The second calculation unit 10 calculates the index value indicating the information freshness based on the elapsed time from the time when the data is acquired by the observation terminal 2. The control unit 9 adjusts the resource of the processing of the processing unit 6 so as to increase the information freshness indicated by the index value calculated by the second calculation unit 10.

The control unit 9 does not require the target value of the index value based on the queueing model. Therefore, the information processing system 1 is applicable even for a system not modeled by the queueing model. In addition, even in the case where the model of the system dynamically changes, the control unit 9 can adjust the resource of the processing of the processing unit 6 following the changing model.

Embodiment 3

In Embodiment 3, points different from the example disclosed in Embodiment 1 or Embodiment 2 will be described in detail. For features not described in Embodiment 3, any features of the example disclosed in Embodiment 1 or Embodiment 2 may be adopted.

Figure 8:
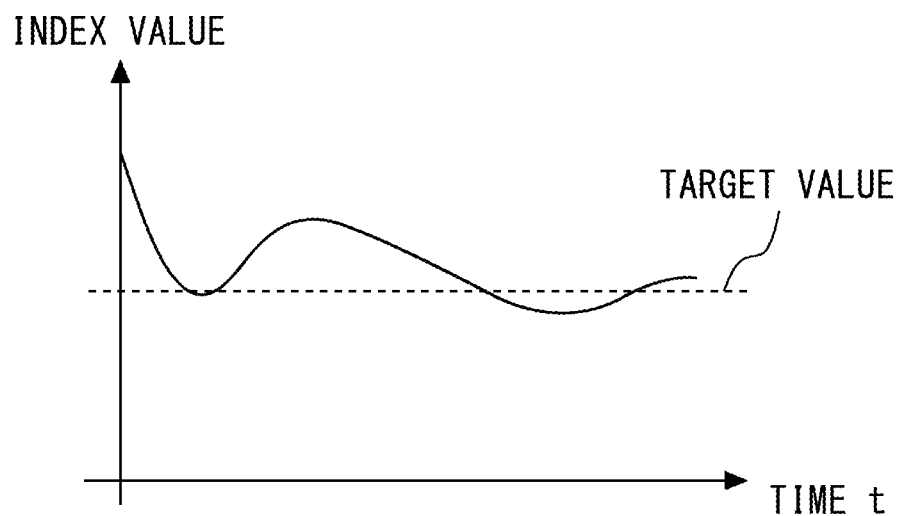
FIG. 8 is the diagram illustrating an example of the control of the index value indicating the information freshness by the control unit according to Embodiment 3.

FIG. 8 is the diagram illustrating an example of the control of the index value indicating the information freshness by the control unit according to Embodiment 3.

In FIG. 8, the horizontal axis indicates the time t. In FIG. 8, the vertical axis indicates the index value of the information freshness. In this example, the index value indicates that the information freshness is higher when the value is smaller.

In FIG. 8, the target value of the index value calculated by the second calculation unit 10 is indicated with the broken line. The index value is preset. The index value of the information freshness is the moving average MA[A] of the AoI for example. Here, the target value of the index value may be a value larger than the minimum value the index value can take. The target value of the index value is preset so as to keep the required information freshness for example.

The control unit 9 adjusts the resource of the processing of the processing unit 6 so that the index value calculated by the second calculation unit 10 becomes the target value. The control unit 9 outputs the control signal which adjusts the resource to the processing unit 6. The control unit 9 controls the adjustment amount of the resource by the PID control for example. Alternatively, the control unit 9 may control the adjustment amount of the resource by the reinforcement learning for example. At the time, the reward of the reinforcement learning is calculated based on the deviation between the calculated value and the target value of the index value for example.

As described above, the information processing system 1 according to Embodiment 3 includes the second calculation unit 10. The second calculation unit 10 calculates the index value indicating the information freshness based on the elapsed time from the time when the data is acquired by the observation terminal 2. The control unit 9 adjusts the resource of the processing of the processing unit 6 so that the index value calculated by the second calculation unit 10 becomes the predetermined target value.

Accordingly, the control unit 9 does not increase the index value of the information freshness more than required. Therefore, the resource of the processing of the processing unit 6 is not allocated more than required for the data processing. For example, in the case where the processing unit 6 performs the processing other than the processing of the data received by the buffer unit 5, the resource of the processing unit 6 is not allocated more than required to the processing of the data in the buffer unit 5.

INDUSTRIAL APPLICABILITY

The information processing system according to the present invention is applicable to the processing of sequentially acquired data.

REFERENCE SIGNS LIST

1 Information processing system
2 Observation terminal
3 Display device
4 Reception terminal
5 Buffer unit
6 Processing unit
7 Output unit
8 First calculation unit
9 Control unit
10 Second calculation unit
1*a* Hardware
1*b* Processor
1*c* Memory

The invention claimed is:

1. An information processing system comprising:
circuitry
to sequentially receive data acquired by an observation terminal from the observation terminal;
to sequentially process the received data; and
to control an index value indicating information freshness by adjusting a resource for processing the received data, the index value being calculated based on elapsed time from a time when the data is acquired by the observation terminal, wherein
the circuitry calculates an acquisition rate of the data by the observation terminal and a service rate of the processing, and
the circuitry controls the service rate by adjusting the resource for the processing the received data so that, when a relation between a utilization rate for which the acquisition rate is divided by the service rate and the index value is predetermined by a queueing model, the utilization rate obtained from the acquisition rate and the calculated service rate becomes a utilization rate corresponding to a target value of the index value predetermined based on the acquisition rate and the queueing model.

2. The information processing system according to claim 1, wherein:
the circuitry calculates the index value based on the elapsed time; and
the circuitry adjusts the resource for processing the received data so as to increase the information freshness indicated by the calculated index value.

3. The information processing system according to claim 1, wherein:
the circuitry calculates the index value based on the elapsed time; and the circuitry adjusts the resource for the processing the received data so that the calculated index value becomes a predetermined target value.

4. The information processing system according to claim 1, wherein the circuitry calculates a time average of the elapsed time value in a steady state as the index value.

5. The information processing system according to claim 1, wherein the resource for processing the received data includes at least one of a selection of a processing circuit from a plurality of processing circuits having different processing performance, a clock frequency of a processing circuit, and a number of cores in the processing circuit to perform the processing.

6. The information processing system according to claim 1, wherein the circuitry to control the index value is configured to adjust the resource for processing the received data by Proportional-Integral-Differential (PID) control.

7. The information processing system according to claim 1, wherein the circuitry to control the index value is configured to adjust the resource for processing the received data based on a reinforcement learning, wherein a reward of the reinforcement learning is calculated based on a value of a service rate of the processing.

8. An information processing method comprising:
sequentially receiving data acquired by an observation terminal from the observation terminal;
sequentially processing the received data;
calculating an index value indicating information freshness, the calculating being performed based on relapsed time from a time when the data is acquired by the observation terminal;
controlling the index value by adjusting a resource for processing the received data;
calculating an acquisition rate of the data by the observation terminal and a service rate of the processing; and
controlling the service rate by adjusting the resource for processing the received data so that, when a relation between a utilization rate for which the acquisition rate is divided by the service rate and the index value is predetermined by a queueing model, the utilization rate obtained from the acquisition rate and the calculated service rate becomes a utilization rate corresponding to a target value of the index value predetermined based on the acquisition rate and the queueing model.

* * * * *